United States Patent [19]

White et al.

[11] 4,356,721
[45] Nov. 2, 1982

[54] GLASS LEAD SEAL TEST APPARATUS

[75] Inventors: James W. White; Victor W. Ruwe; Donald R. Davis, all of Huntsville, Ala.

[73] Assignee: The United States of America as represented by the Secretary of the Army, Washington, D.C.

[21] Appl. No.: 218,235

[22] Filed: Dec. 19, 1980

[51] Int. Cl.³ .............................................. G01M 3/20
[52] U.S. Cl. ...................................... 73/40.7; 73/49.3
[58] Field of Search ................................ 73/40.7, 49.3

[56] References Cited

U.S. PATENT DOCUMENTS

| | | | |
|---|---|---|---|
| 3,416,359 | 12/1968 | Durbin et al. | 73/40.7 |
| 3,762,212 | 10/1973 | Morley et al. | 73/40.7 |
| 3,914,983 | 10/1975 | Umezu | 73/40.7 |
| 4,158,960 | 6/1980 | White et al. | 73/40.7 |

FOREIGN PATENT DOCUMENTS

| | | | |
|---|---|---|---|
| 2135751 | 4/1979 | Fed. Rep. of Germany | 73/40.7 |
| 2000300 | 1/1979 | United Kingdom | 73/40.7 |

Primary Examiner—Edward R. Kazenske
Assistant Examiner—Joseph W. Roskos
Attorney, Agent, or Firm—Nathan Edelberg; Robert P. Gibson; James T. Deaton

[57] ABSTRACT

Glass lead seal test apparatus in which a multiplicity of microcircuit packages with the leads sealed relative thereto by glass are checked for leakage between the glass seals and the microcircuit package structure and relative to the leads; this is accomplished by providing an apparatus for evacuating a chamber of the microcircuit packages and a chamber of the apparatus, and then injecting helium into the chamber of the apparatus and then utilizing test structure to test leakage around the glass seals if a perfect seal is not present. The device is designed to handle a multiplicity of microcircuit packages during a given test cycle.

3 Claims, 4 Drawing Figures

4,356,721

GLASS LEAD SEAL TEST APPARATUS

DEDICATORY CLAUSE

The invention described herein may be manufactured, used, and licensed by or for the Government for governmental purposes without the payment to us of any royalties thereon.

BACKGROUND OF THE INVENTION

In the past, there has been a problem with efficiently and effectively checking microcircuit packages that have glass seals around each electrical lead for sealing between the electrical lead and the metal housing of which the microcircuit package is made. Also, the glass seals also serve as an insulating means. These microcircuit packages must be randomly checked prior to shipping or use. Often, glass lead seals fail to seal properly and some of these microcircuit packages contain as many as 48 glass lead seals. These glass lead seals can be damaged during shipping to the assembly plant, and accordingly, it is necessary to check each microcircuit package prior to bonding the required substrate in the microcircuit package and prior to connecting the internal electrical leads to the substrate. Therefore, there is a need for a glass lead seal test apparatus that can be used efficiently to test microcircuit package assemblies completely before the substrates are bonded therein.

Accordingly, it is an object of this invention to provide a glass lead seal test apparatus that can be used to efficiently test a multiplicity of microcircuit packages for leaking of the glass seals to show which packages have glass seals that leak.

Another object of this invention is to provide a glass lead seal test apparatus that is relatively simple and yet accurately indicates which microcircuit packages fail to meet the leakage test.

Other objects and advantages of this invention will be obvious to those skilled in this art.

SUMMARY OF THE INVENTION

In accordance with this invention, glass lead seal test apparatus is provided which includes a test apparatus with a chamber therein for mounting a multiplicity of microcircuit packages and the chamber is provided with means for pulling a vacuum for evacuating the chamber of the microcircuit packages and for evacuating and back filling the chamber of the test apparatus with helium and then utilizing apparatus connected to the chamber of the microcircuit packages to measure a helium flow rate by a mass spectrometer which indicates leakage of any particular microcircuit package seal. The device also includes means for indicating and noting which microcircuit packages have leakage therein. The device is adapted to quickly test a multiplicity of microcircuit packages individually and very accurately.

DESCRIPTION OF THE PREFERRED EMBODIMENT

Figure 1:
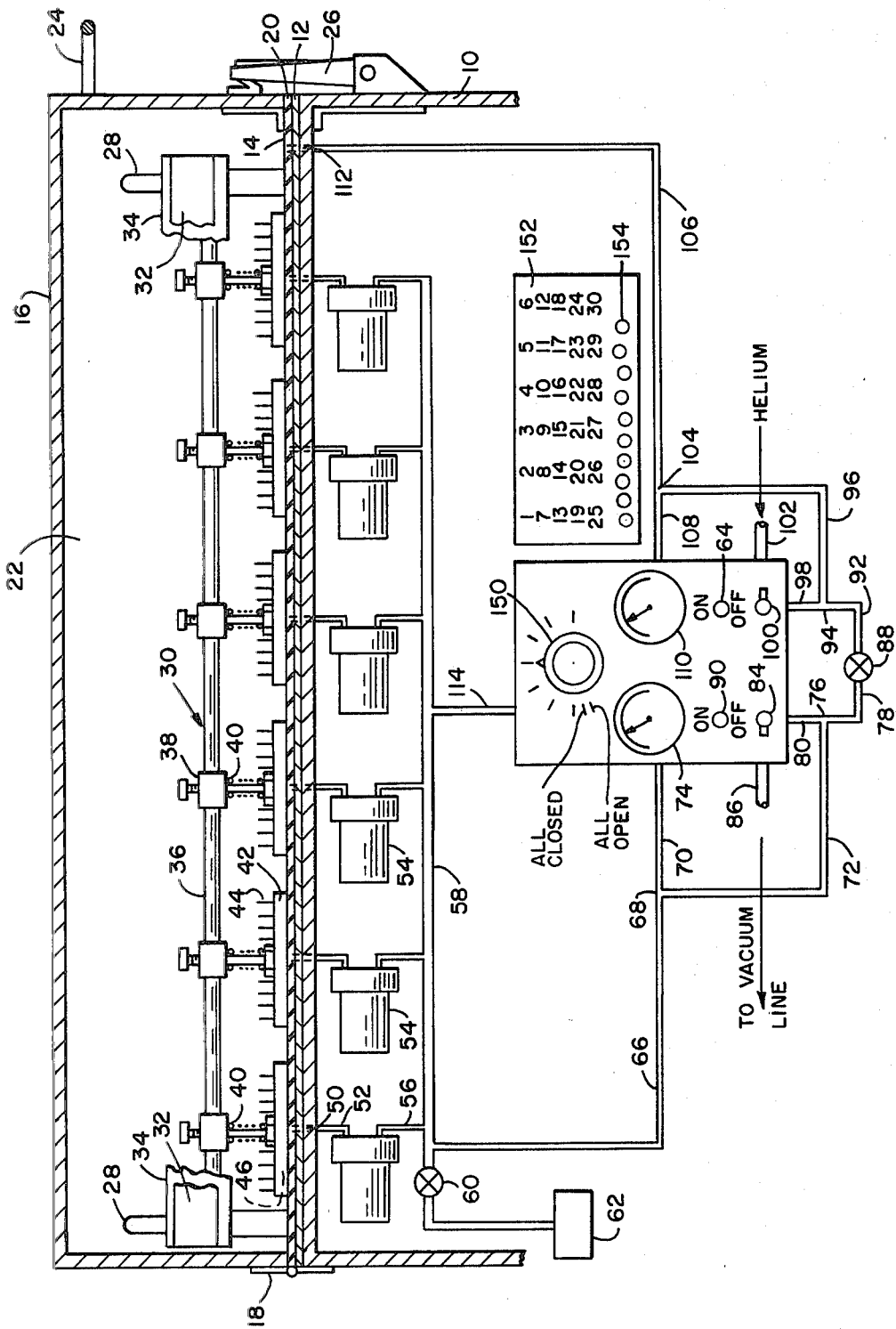
FIG. 1 is a schematic sectional view particually cutaway of the glass lead seal test apparatus in accordance with this invention.
Figure 2:
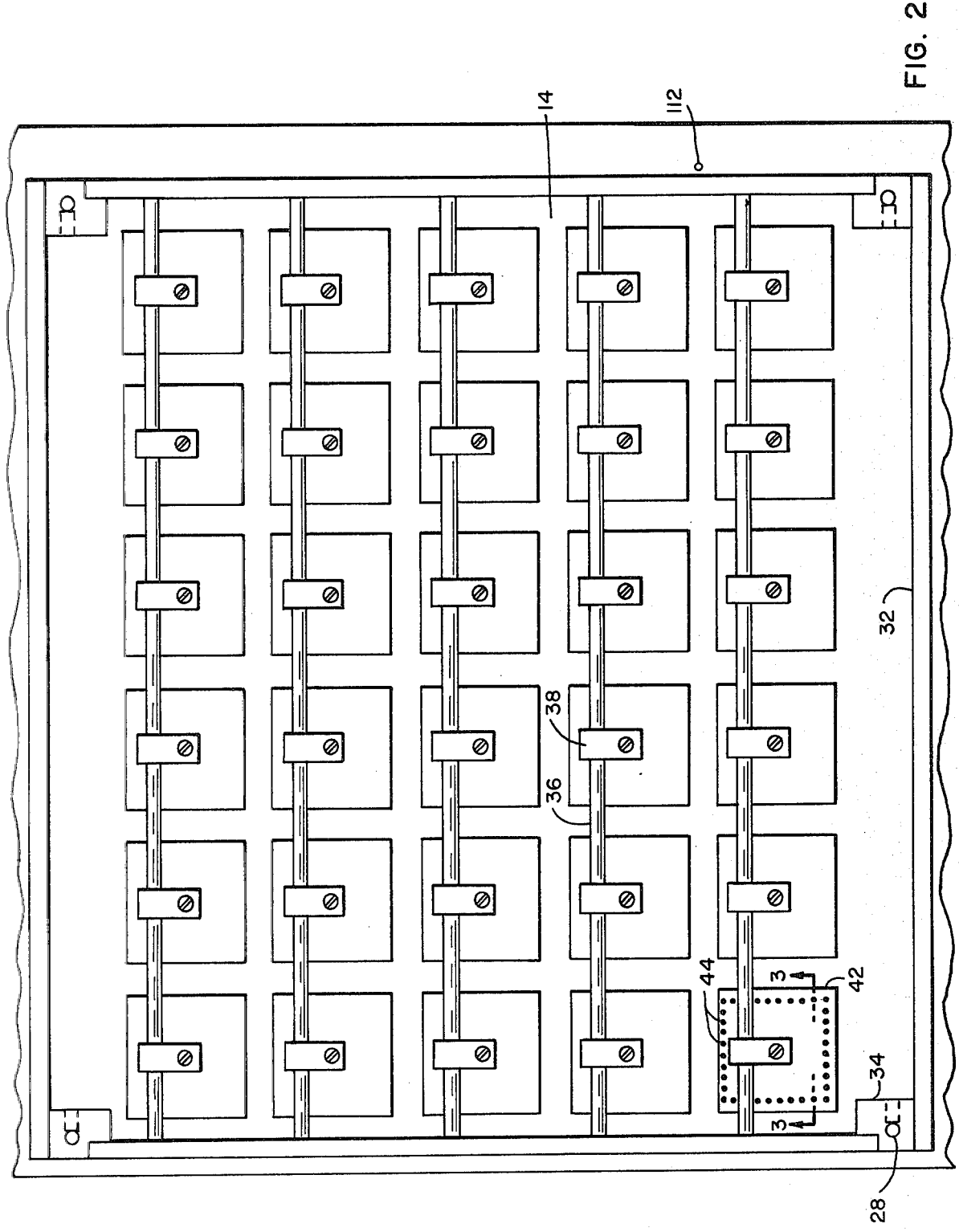
FIG. 2 is a top plan view with the cover removed and portions cutaway and illustrating one of the microcircuit packages more specifically and the others schematically.
Figure 4:
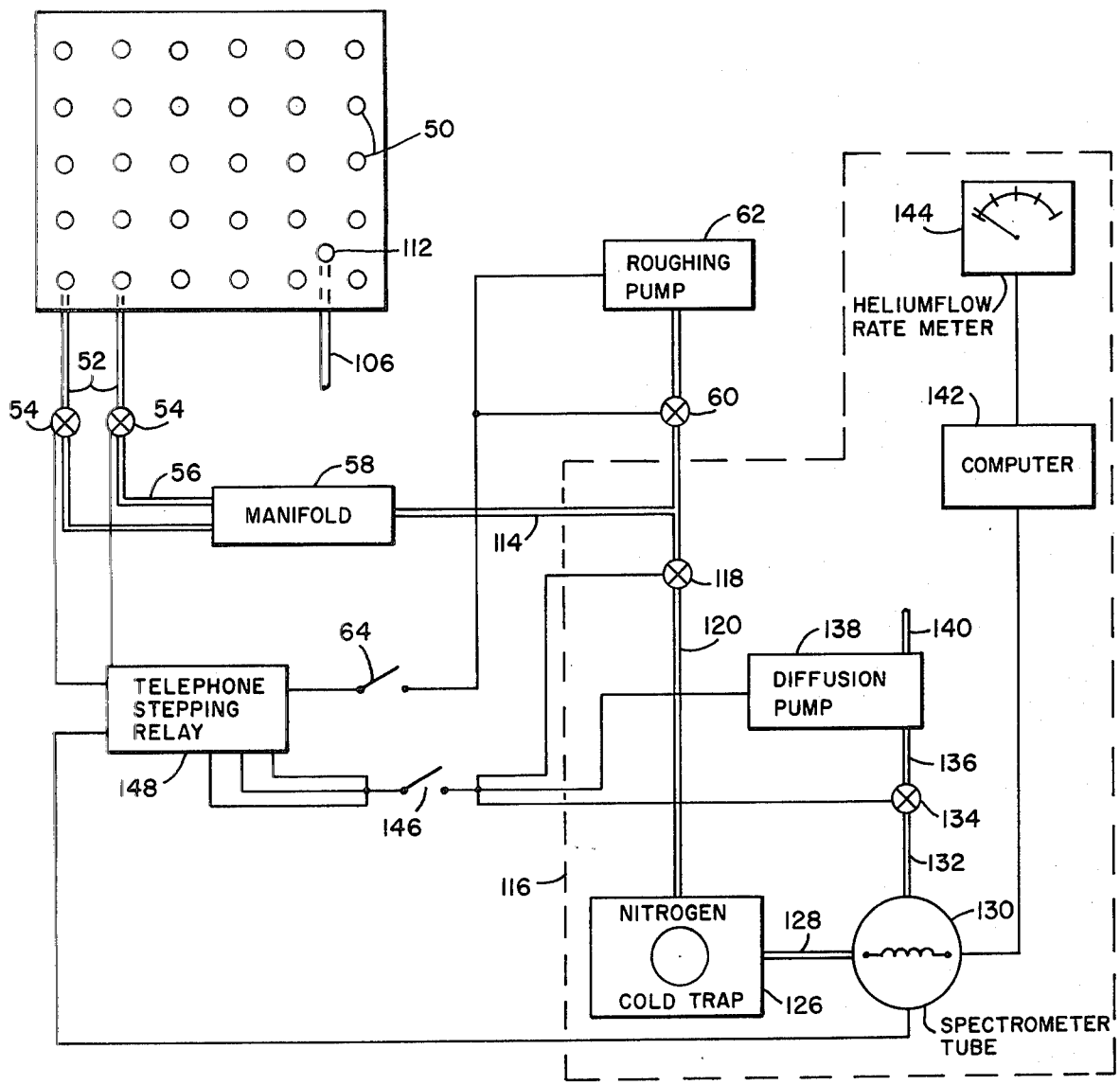
FIG. 4 is a schematic system illustration of the glass lead seal test apparatus in accordance with this invention.
Figure 3:
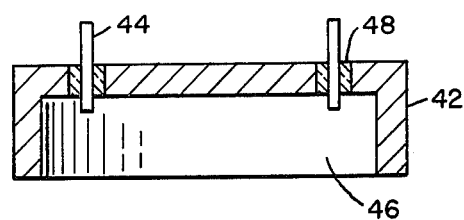
FIG. 3 is a sectional view taken along line 3—3 of FIG. 2.

Referring now to the drawing, in FIG. 1 the glass lead seal test apparatus includes a base 10 which has a plate 12 secured on a top surface thereof in a conventional manner and a resilient pad 14 is mounted in a conventional manner to a top surface of plate 12. A cover 16 is pivotably mounted by hinge 18 in a conventional manner to base 10 as illustrated and has a lower edge 20 that contacts resilient pad 14 and seals relative thereto to define chamber 22 between cover 16 and resilient pad 14. Cover 16 has a handle 24 secured thereto in a conventional manner and a latch mechanism 26 is used to hold cover 16 in sealing relation with resilient pad 14. Base 10 has four studs 28 secured thereto to project into chamber 22 as illustrated. A clamp down assembly 30 includes a rectangular frame 32 (See FIG. 2) with snap type locking means 34 at each corner which telescopes over each of studs 28 and snaps into a holding position. Five bars 36 are secured to opposite sides of frame 32 in a conventinal manner and each of these bars 36 has 6 clampdown assemblies 38 secured thereto in a conventional manner for spring biasing, by spring 40 (See FIG. 1), each microcircuit package 42 down into sealing relationship to a top surface of resilient pad 14. Each microcircuit package 42 has a multiplicity of leads 44 that project from an outer surface of microcircuit packge 42 to an internal chamber section 46 (See FIG. 3) and each lead 44 is sealed relative to the structure of microcircuit package 42 by a glass lead seal 48 (See FIG. 3). Base structure 10, plate 12 and resilient means 14 each have a passage 50 therethrough for inner connecting chamber 46 of each microcircuit package 42 to line 52 of solenoid valve 54 which is connected by line 56 into manifold section 58. As illustrated, each microcircuit package 42 has a solenoid 54 and inner connecting structure connected for evacuating its respective chamber 46. A solenoid valve 60 is connected to manifold 58 and to vacuum roughing pump 62. Solenoid valve 60 and roughing pump 62 are controlled by on-off switch 64 (See FIGS. 1 and 4). Conduit 66 is connected to manifold 58 and to tee 68 which is inner connected to conduits 70 and 72. Conduit 70 is connected to gage 74 for indicating the vacuum in manifold 58. Conduit 72 is connected through tee 76 to conduits 78 and 80 with conduit 80 connected through on-off vacuum valve 84 to line 86 which is adapted to be connected to a vacuum line source. Conduit 78 is connected through solenoid valve 88 which is controlled by on-off switch 90 for inner connecting conduit 78 with conduit 92 which is connected through tee 94 to conduits 96 and 98. Conduit 98 is connected through on-off valve 100 which is connected to line 102 which has a helium source connected thereto. Conduit 96 is connected through tee 104 to conduits 106 and 108 with conduit 108 inner connected to gage 110. Conduit 106 is connected through passage 112 to chamber 22 inside cover 16. Manifold 58 is also connected through conduit 114 to other control structure 116 (See FIG. 4). Control structure 116 includes an on-off solenoid operated valve 118 which is connected to conduit 114 and conduit 120, with nitrogen coldtrap 126 inner connected between conduits 120 and 128, with spectrometer tube 130 connected between conduits 128 and 132, with on-off solenoid operated valve 134 connected between conduits 132 and 136 and with diffusion pump 138 connected to sump line 140.

Spectometer tube 130 is connected to a conventional computer structure 142 and helium flow rate meter 144 for indicating when helium is present in manifold 58 and the conduits connected thereto. Each of on-off solenoid valves 118, 134 an diffusion pump 138 are controlled by switch 146 which either opens and closes or turns these devices on or off. Switch 146 is connected back to telephone stepping relay 148 which has a power supply and conventional interconnecting circuits controlled by a knob 150 (See FIG. 1) which can be positioned to an all open position in which all solenoids 54 are open, to a position of all closed in which all of solenoids 54 are switched off with the valve thereof closed, and positions 1 through 30 in which individual solenoids 54 are turned on with the valve thereof open and with the number indicating the solenoid open being interconnected and lit by a lighted number on panel 152. A multiplicity of permanent type magnet indicator means 154 are positioned at the base of panel 152 for placing over or around the particular number that may indicate a microcircuit package with a glass lead that is leaking.

In operation, when it is desired to test glass lead seals 48 of microcircuit packages 42, latch 26 is released and cover 16 is pivoted about hinge 18 to a fully open position. With cover 16 open and with clamp down mechanism 30 removed, microcircuit packages 42 are inserted over their respective vacuum port 50 and clamp down structure 30 is placed in position and pushed down on studs 28 into a clamping position as illustrated in FIG. 1. Next, cover 16 is latched in the closed position as illustrated in FIG. 1 and the device is now ready for performing the leak test. With knob 150 of telephone stepping switch 148 in the all closed position, knob 150 is rotated to the all open position to open all of solenoid valves 54. Next on-off switch 90 is turned on to open solenoid valve 88 and then manual vacuum valve 84 is opened to allow vacuum through vacuum line 86 to be pulled on chamber 22 and each of chambers 46 of microcircuit packages 42. This vacuum is pulled on these chambers until a pressure of 25 inches of mercury is indicated on gage 74. When a pressure of 25 inches of mercury is reached, manual vacuum valve 84 is turned off. Then, on-off switch 90 is turned off to close solenoid valve 88. Chamber 22 is then back filled by turning on manual on-off valve 100 to allow helium from line 102 to pass through conduits 98, 96, 106, and passage 112 until a helium pressure of 30 inches of mercury is indicated by gage 110. Manual valve 100 is then turned off. On-off switch 64 is then turned on to open solenoid valve 60 and roughing vacuum pump 62 to pull more vacuum on chambers 46 of microcircuit packages 42 and manifold 58. On-off switch 64 is then turned off to close solenoid valve 60 and turned off roughing vacuum pump 62. Knob 150 of telephone stepping switch 148 is then turned from the all-open position to the all closed position to close each of solenoid valves 54. Knob 150 is then rotated to microcircuit package position number 1 which opens the first of solenoid actuated valves 54 and then switch 146 (See FIG. 4) is closed to turn on solenoid actuated valves 118, 134, and vacuum diffusion pump 138. With vacuum diffusion pump 138 on and solenoid actuated valves 118, and 134 open, if there is a helium leakage at microcircuit package number 1, this helium which is leaking will flow through nitrogen coldtrap 126 and then through spectometer tube 130 to trigger helium flow rate meter 144 which will indicate the helium flow rate. If microcircuit package number 1 as indicated on board 152 has a glass lead seal that is leaking, one of magnetic rings 154 will be placed over this particular number to indicate that this microcircuit package has a leak. If no leak is detected, knob 150 is turned to number 2 and the same test observed for number 2 and so on until all packages have been tested. When a package is found to have a glass lead seal that is leaking, the helium has to be purged from manifold 58 and the lines connected thereto in a conventional manner before proceeding to the next package to be tested. That is, the helium in manifold 58 and the lines connected thereto are purged by the vacuum sources to rid the system of the helium that has leaked. After all of microcircuit packages 42 have been tested, on-off switch 146 is turned off and knob 150 is rotated back to the all open position to open all of solenoid valves 54. Cover 16 is then unlatched and clamp-down assembly 30 is removed. The microcircuit packages 42 that have leaks are removed first and then the good microcircuit packages are removed. The good microcircuit packages are then moved to the next assembly work station for utilization thereof. Obviously, this device is intended to be used over and over to test microcircuit packages for leakage of glass lead seals.

We claim:

1. Glass lead seal test apparatus comprising a base member, seal means mounted on the base member, a cover mounted to the base and being moveable into and out of sealing relationship with said seal means and defining a chamber with said seal means, a clamp down assembly removably mounted relative to said base and being adapted for clamping microcircuit packages into sealing relationship with said seal means with said microcircuit packages having leads therein with glass seals between each lead and the structure of the microcircuit package and defining a chamber with said seal means, said base member having first passage means for communicating with the chamber defined by said microcircuit package and said seal means, a second passage means through said base member and communicating with said chamber defined by said cover and said seal means, first control means connected to said first and second passage means for pulling a vacuum on the chamber of said microcircuit package and said chamber defined by said cover and said seal means, second control means connected to said second passage means and adapted for filling said chamber defined by said cover and said seal means with an inert gas, second control means connected with said first passage means for pulling a vacuum thereon and having means for testing for any leakage of said inert gas leaking past said glass lead seals into said chamber defined by said microcircuit package and said seal means and into said first passage means, said clamp down assembly being designed to clamp a multiplicity of microcircuit packages in sealing relationship with said seal means to define a chamber between each microcircuit package and said seal means and said first passage means including a multiplicity of passages with an individual passage communicating with a respective chamber of a microcircuit package, and said means for testing including means for individually switching from the chamber of each microcircuit package to the other until all microcircuit packages have been tested.

2. Glass lead seal test apparatus as defined in claim 1, wherein said inert gas is helium, wherein said means for testing also include a nitrogen coldtrap and a mass spectrometer that are connected in series.

3. Glass lead seal test apparatus as defined in claim 2, wherein said means for testing also includes means which indicate the particular microcircuit package being tested and means for marking a particular microcircuit package when it is found to have a glass lead seal that is leaking.

* * * * *